Aug. 29, 1944.   J. C. BRIGGS   2,357,074
CUTTING TOOL
Filed Nov. 4, 1942   2 Sheets-Sheet 1
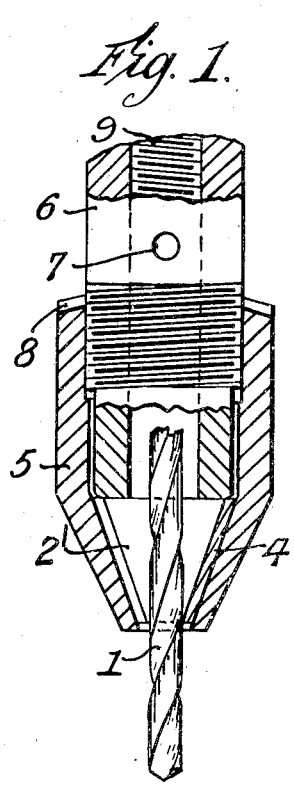
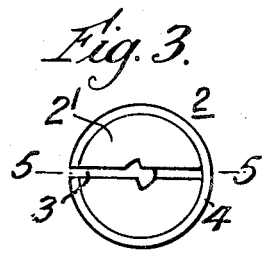
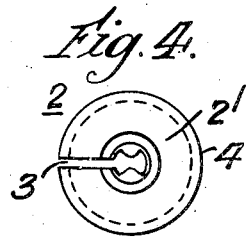
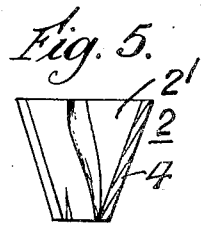
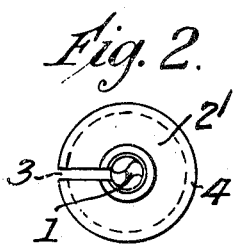
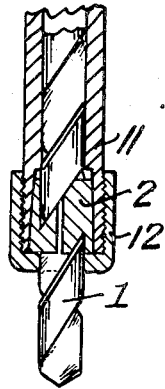
Inventor:
John Cockbain Briggs
By his attorneys:
Baldwin & Wight Aug. 29, 1944.  J. C. BRIGGS  2,357,074
CUTTING TOOL
Filed Nov. 4, 1942  2 Sheets-Sheet 2
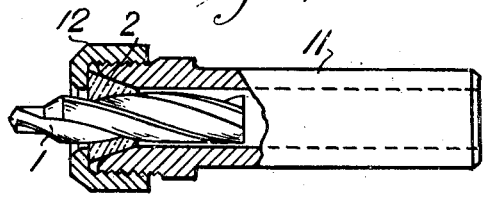
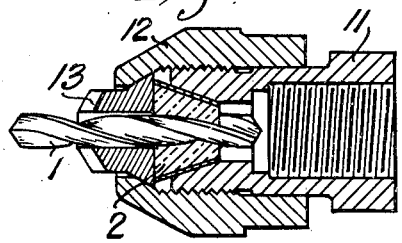
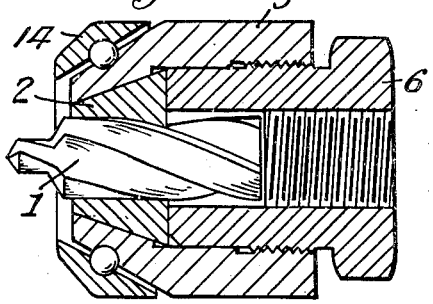
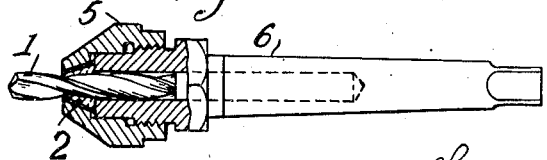
Inventor:
John Cockbain Briggs.
By his attorneys,
Baldwin & Wight Patented Aug. 29, 1944

2,357,074

UNITED STATES PATENT OFFICE 2,357,074

CUTTING TOOL

John Cockbain Briggs, Harrogate, England

Application November 4, 1942, Serial No. 464,499
In Great Britain November 1, 1940

4 Claims. (Cl. 77—66)

The invention relates to improvements in fluted cutting tools, particularly drills, reamers, taps and such like cutting tools.

The conventional drill consists of the cutting end in which the flutes are formed, and the shank end for registering in the drill chuck and forming the driving end.

In manufacturing the conventional drill a number of different operations are necessary to form the cutting end and the driving end.

The invention comprises a form whereby the number of operations are reduced, and a drill is produced which will have a considerably longer useful life, and will also enable drills broken in use to be again used.

By the invention the shank may be dispensed with and the drill produced with the cutting flutes or helix throughout its length, thus enabling long lengths to be machined without breaking down the machine, reducing the time of production.

The length as produced may be cut into suitable lengths for the drills on the same machine.

The lengths however may be considerably longer than a corresponding drill and shank of conventional form.

The invention consists in providing in or for combination with a fluted cutting tool a holder comprising a compressible collet hollow throughout with an internal form complementary with the fluted form of the tool so that it will thread upon the tool in close-matched engagement, the holder being adapted to accommodate varying lengths of tool within it so that a tool may be threaded through the collet to any desired extent to leave such operative length projecting from the holder as is required, and means for compressing the collet to clamp the engagement in the desired position and securing the collet in the holder, so that the collet will take the drive and longitudinal thrust on the tool.

The collet may be made resiliently compressible by splitting it longitudinally without completely severing it. It is preferably of conical or tapered external form so that it may be compressed by being forced longitudinally into a housing member of corresponding internal form.

The holder according to the invention constitutes a detachable adjustable shank adapted to be connected to the drive of a machine or hand tool.

The collet is preferably made as a casting around the fluted cutting tool or a core of corresponding form, a metal exterior for the said part of the holder being provided by lining the casting mould with a piece of metal shaped to conical or tapered form and dimensioned so that there is a small gap between the side edges corresponding to a longitudinal slit to be subsequently formed along the side of the casting and across to the other side or nearly so.

The collet may be made of soft metal or of rubber or other like vibration absorbing material.

In a conventional drill the core and flute dimension varies and increases in thickness from the point to the shank. With the holder of the present invention, the core and flute dimension may be constant along the whole or a substantial portion of the length of the tool. Such novel form of tool is accordingly a further feature of the invention.

The holder, and its combination with a drill, according to the invention, may be combined with further cutting tools, e. g., a countersinking cutter. This cutter may be produced from high speed steel and the cutting edges formed on the end of the holder or on a piece which may be brazed or cemented upon or clamped in the end of the holder.

It will be appreciated that by the invention a stub drill of variable length can be provided which is held securely near the working end for sheet metal work, particularly for the aircraft industry, to prevent breakage of drills which occurs when the drill is held by the conventional shank.

Scrapping of drills due to the scoring of the shank when the stress on the drill causes the chuck to rotate on the drill is also avoided.

The invention is illustrated by way of example in the accompanying drawings, in which—

Figure 1 is a view in sectional elevation of an assembled holder and drill.

Figure 2 is an underside plan view of the drill and collet.

Figure 3 is a top view of the collet.

Figure 4 is an underside view of the collet.

Figure 5 is a section of the collet on the line 5—5 of Figure 3.

Figure 6 is a view in sectional elevation of a modification.

Figure 7 is a view in sectional elevation of a further modification illustrating a centre drilling tool.

Figure 8 is a view in sectional elevation of a counter-sinking tool, and

Figure 9 is a view in sectional elevation of a modified form of countersinking tool.

Figure 10 illustrates in sectional elevation a form of the invention where the holder is provided with a Morse taper shank.

Referring to Figures 1-5, 1 is a fluted drill which is engaged by a collet 2, which is slit down one side as shown at 3, the slit extending nearly across to the other side.

The internal form of the collet 2, matching the form of the fluted drill, is preferably produced by casting the collet in a mould lined with a piece of metal, as hereinbefore described, which provides a resilient outer shell 4 for the cast portion 2' of the collet, which portion is completely split by the slit 3.

The collet, of conical form as shown, is housed in the holder body 5 which at its lower end is internally shaped to corresponding conical form. The collet is driven into the housing, so that it is compressed to clamp the drill 1, by the hollow shaft 6 which screws into the top end of the holder body 5. The hole 7 in the shaft 6 is for engagement by the pin of a device (not shown) for screwing up and unscrewing the shaft. The top rim of the holder body may be serrated as indicated at 8 to grip a corresponding part, rotatable relatively to the pin, of the said device.

The shaft is internally screw threaded as indicated at 9 to engage with a part connecting the shaft, in customary manner, to the drive of a machine or hand tool.

In the modified form shown in Figure 6, the collet 2 is compressed into the housing member 11 by the nut 12 screwing upon the outside of the housing member.

In the form shown in Figure 7 the construction is similar to Figure 6 except that a centre drilling tool is mounted in the holder.

In Figure 8 the collet 2 is compressed into the housing member 11 by the nut 12 screwing upon the outside of the housing member. The nut 12 accommodates and frictionally engages a countersinking bit 13 through the bore of which passes the drill 1.

In Figure 9 the collet 2 is compressed in the housing member 5 by the hollow shaft 6 which is in screw threaded engagement with the member 5. The tool 1 in this case is a countersinking tool and the face of the member 5 is provided with a floating part 14 mounted on ball bearings which constitutes a depth stop which will engage the work without rotating relatively thereto and will thus avoid damaging the face of the work.

In Figure 10 the collet 2 is compressed in the holder 5 by the shaft 6 which has the form of a Morse taper shank.

It will be seen that with the construction according to the invention varying lengths of drill may be accommodated, that the drill may be adjusted so as to have projecting from the holder such length as may be desired, and that as the drill wears it can be fed further out of the holder. Moreover, the collet is adapted, without providing it with positive locking engagement with the drill or the holder, to take both the thrust and the drive or torque.

What I claim is:

1. For combination with a fluted cutting tool, a holder comprising a compressible collet hollow throughout and internally conforming to the flutes and external surface of the tool so that it will thread upon the tool in close-matched engagement, the holder being provided with a recess to accommodate varying lengths of tool within it so that a tool may be threaded through the collet to any desired extent to leave such operative length projecting from the holder as is required, and means for compressing the collet to clamp the tool in the desired position and securing the collet in the holder, so that the collet will take the drive and longitudinal thrust on the tool.

2. The holder as claimed in claim 1 on the end of which is formed a further cutting tool.

3. The structure as claimed in claim 1 in which the collet comprises a body provided with a separate external tapered shell of metal about said body united thereto, and the collect having a slit along one side extending through the shell and said body at least to said bore.

4. In combination with structure as claimed in claim 1, a hollow auxiliary tool through which the cutting tool extends, said auxiliary tool having a tapered outer surface in abutting relationship with an internal tapered surface of the holder and the said collet being in end-to-end abutting relationship with said auxiliary tool, the said means for compressing the collet serving also to compress together the abutting surfaces of the auxiliary tool and the holder.

JOHN COCKBAIN BRIGGS.